United States Patent
Tan et al.

(10) Patent No.: US 11,758,905 B2
(45) Date of Patent: Sep. 19, 2023

(54) AMPHOTERICIN B AND β-1,3-GLUCANASE LOADED BI-FUNCTIONAL NANO-SYSTEM WITH BOTH TARGETS, PREPARATION METHOD AND APPLICATION THEREOF

(71) Applicant: QINGDAO AGRICULTURAL UNIVERSITY, Shandong (CN)

(72) Inventors: Yulong Tan, Qingdao (CN); Su Ma, Qingdao (CN)

(73) Assignee: QINGDAO AGRICULTURAL UNIVERSITY, Shandong (CN)

( * ) Notice: Subject to any disclaimer, the term of this patent is extended or adjusted under 35 U.S.C. 154(b) by 62 days.

(21) Appl. No.: 17/677,931

(22) Filed: Feb. 22, 2022

(65) Prior Publication Data
US 2022/0346373 A1   Nov. 3, 2022

(30) Foreign Application Priority Data
Apr. 30, 2021   (CN) .......................... 202110482662.7

(51) Int. Cl.
A01N 25/12    (2006.01)
A01N 63/50    (2020.01)
A01N 43/90    (2006.01)

(52) U.S. Cl.
CPC ............. *A01N 25/12* (2013.01); *A01N 43/90* (2013.01); *A01N 63/50* (2020.01); *C12Y 302/01058* (2013.01)

(58) Field of Classification Search
None
See application file for complete search history.

(56) References Cited

FOREIGN PATENT DOCUMENTS

| CN | 104203217 A | 12/2014 |
|---|---|---|
| CN | 113209031 A | 8/2021 |
| WO | 2019081965 A1 | 5/2019 |

OTHER PUBLICATIONS

Ludwig ("Antifungal Activity of Chitosan-Coated Poly(Lactic-co-glycolic) Acid Nanoparticles containing Amphotericin B", Mycopathologia (2018), 183:659-668) (Year: 2018).*
Yulong Tan et al., "Beta-1,3-glucanase disrupts biofilm formation and increases antifungal susceptibility of Candida albicans DAY185" International Journal of Biological Macromolecules, vol. 108, pp. 942-946 (Nov. 4, 2017).
Vivek Kamat et al., "Synthesis of Monodisperse Chitosan Nanoparticles and in Situ Drug Loading Using Active Microreactor" ACS Appl. Mater. Interfaces 2015, 7, 22839-22847 (Oct. 8, 2015).
Mingyue Mo et al., "Research progress on preparation and application of chitosan drug-loaded microcapsules" Tianjin Chemical Industry, vol. 19, No. 6, pp. 1-4 (Nov. 30, 2005).

* cited by examiner

*Primary Examiner* — Robert J Yamasaki
*Assistant Examiner* — Charles Zoltan Constantine
(74) *Attorney, Agent, or Firm* — SZDC LAW P.C.

(57) ABSTRACT

The invention belongs to the technical field of nano-drugs, and in particular, relates to an amphotericin B (AmpB) and β-1,3-glucanase (Gls) loaded bi-functional nano-system with both targets, a preparation method and an application thereof. The nano-system provided by the invention comprises Gls and AmpB loaded chitosan nanoparticles. The β-1,3-glucanase modified chitosan nanoparticles are constructed for the first time, which can achieve a bi-functional nano-system both targeting fungal biofilm exopolysaccharide β-1,3-glucan and internal thalli; meanwhile, the β-1,3-glucanase and the amphotericin B have a synergistic interaction effect, so that the removal capacity is improved. The double-loaded nano-system is used for fungal biofilm damage removal for the first time.

7 Claims, 5 Drawing Sheets

AMPHOTERICIN B AND β-1,3-GLUCANASE LOADED BI-FUNCTIONAL NANO-SYSTEM WITH BOTH TARGETS, PREPARATION METHOD AND APPLICATION THEREOF

This application claims priority to Chinese Patent Application No. 202110482662.7, filed on Apr. 30, 2021, which is incorporated by reference for all purposes as if fully set forth herein.

TECHNICAL FIELD

The invention belongs to the technical field of nano-drugs, and in particular, relates to an amphotericin B and β-1,3-glucanase loaded bi-functional nano-system with both targets, a preparation method and an application thereof.

BACKGROUND

*Candida albicans*, which is one of the main food-borne pathogenic fungus, frequently triggers relevant food safety events and even leads to patient death. Statistically, invasive candidiasis has become a main cause for fungus related disease mortality, and the mortality thereof is higher than 70%. Biofilm is a main existence form of *Candida albicans*, that is, fungal cells adhere on a contact surface to produce a lot of extracellular matrices (mainly comprising polysaccharide) so as to form a microbial aggregation structure through enveloping themselves therein. The extracellular matrix not only participates in the formation of a biofilm structure, but also protects internal microorganisms from being influenced by external adverse environment, so that the drug tolerability thereof is significantly improved by more than 1000 times. However, high-concentration chemical antibacterial drugs in treatment cannot only effectively remove the biofilm, but also increase the risk of severe side effect, lead to the generation of drug-resistance bacteria and even superbacteria, and cause severe infection. In addition, with respect to bacteria, it is greatly limited to select clinical antifungal drugs. Therefore, how to effectively solve the *Candida albicans* biofilm related infection problem through a green and environment-friendly method is a great challenge in the field of food safety.

A main component of the extracellular matrix of the *Candida albicans* biofilm is polysaccharide, comprising α-1,6-mannan, β-1,6-glucan and β-1,3-glucan; these components can ensure the stability of the biofilm structure, and are used as a penetrability barrier to isolate antifungal drugs so as to protect fungal cells in the biofilm. Therefore, the development and utilization of polysaccharide degrading enzymes become a new anti-biofilm direction: the polysaccharide components in the extracellular matrix of the biofilm are degraded through an enzyme to damage the biofilm structure, which can not only inhibit microorganism adhesion and reduce biofilm formation, but also have damage effect on the formed biofilm, so that the internally embedded microbial cells are released. The research on polysaccharide degrading enzymes for bacterial biofilms has been reported, e.g., polysaccharide degrading enzymes DspB and Alginate used for treating bacterial biofilms. However, most research works are only focused on a single bacterial biofilm, and there is very few research focused on the *Candida albicans* biofilm. At present, the infections, etc. caused by drug-resistance bacteria and even superbacteria due to the excessive use of chemical drugs (antibiotics) have become a problem to be urgently solved.

SUMMARY OF THE DISCLOSURE

Aiming at solving the existing problems in the prior art, the invention provides an amphotericin B and β-1,3-glucanase loaded bi-functional nano-system with both targets.

The invention furthermore provides a preparation method the amphotericin B and β-1,3-glucanase loaded bi-functional nano-system with both targets.

The invention furthermore provides an application of the amphotericin B and β-1,3-glucanase loaded bi-functional nano-system with both targets.

To achieve the above-mentioned objective, the invention has the following technical solution:

The invention provides an amphotericin B and β-1,3-glucanase loaded bi-functional nano-system with both targets, wherein the nano-system comprises Gls and AmpB loaded chitosan nanoparticles.

The invention furthermore provides a preparation method of the bi-functional nano-system with both targets, comprising the following steps:
 (1) polyanion sodium tripolyphosphate is used for preparing the chitosan nanoparticles (CSNP) through an ionic gelation method;
 (2) preparation of Gls loaded chitosan nanoparticles, namely CSNP-Gls: CSNP and Gls are added to a PBS buffer solution at the same time; the mixture is stirred at 4° C. for 12 h; then, the NP suspension is centrifuged and freeze-dried;
 (3) preparation of Gls and AmpB loaded chitosan nanoparticles, namely CSNP-AmpB-Gls: the CSNP-Gls suspension is mixed with an AmpB dimethyl sulfoxide solution and the mixture is stirred for 24 h; then, the mixture is centrifuged and freeze-dried.

The chitosan nanoparticles CSNP used in the invention are specifically prepared by the following method: TPP is dissolved in distilled water to obtain a TPP solution with a concentration of 5 mg/mL; chitosan is dissolved in an acetic acid solution with a volume concentration of 1% to obtain a chitosan solution with a concentration of 5 mg/mL; the TPP solution is dropwise added to the chitosan solution, the mixture is stirred for 2 h and then centrifuged.

Further, the mass ratio of chitosan and TPP is 4:1.

Further, in the step (2), the concentration of the CSNP in the PBS buffer solution is 1 mg/mL; the concentration of the Gls in the PBS buffer solution is 100 mcg/mL.

Further, in the step (2), the centrifugal rotation speed is 14000 rpm, and the time is 30 min.

Further, in the step (3), the concentration of the CSNP-Gls suspension is 1 mg/mL, and the solvent is the PBS buffer solution; the concentration of the AmpB dimethyl sulfoxide solution is 100 mcg/mL; the volume ratio of the CSN-Gls suspension and the AmpB dimethyl sulfoxide solution is 1:1.

The invention furthermore provides an application of the bi-functional nano-system with both targets in fungal biofilm damage removal.

The new anti-biofilm provided by the invention has two targets: (1) through the degradation of matrix components, especially polysaccharide components, the extracellular matrix of the biofilm is damaged, the biofilm structure is thoroughly collapsed and the internally embedded fungus cells are released, so that the drug sensitivity thereof is recovered; (2) the fungal cells are effectively skilled with a few side effects to inhibit biofilm formation once again. Therefore, the combined use of a polysaccharide degrading enzyme and an antifungal drug can achieve the bi-functional effect of both targets for the biofilms. The excessive use of chemical drugs (antibiotics) is avoided so as to solve the infection problem caused by drug-resistance bacteria and even superbacteria.

The invention has the following beneficial effects:

(1) The β-1,3-glucanase modified chitosan nanoparticles are constructed for the first time, which can achieve a bi-functional nano-system both targeting fungal biofilm exopolysaccharide β-1,3-glucan and internal thalli; meanwhile, the β-1,3-glucanase and the amphotericin B have a synergistic interaction effect, so that the removal capacity is improved.

(2) According to the invention, the double-loaded nano-system is used for fungal biofilm damage removal for the first time.

DETAILED DESCRIPTION OF THE EMBODIMENTS

Figure 1:
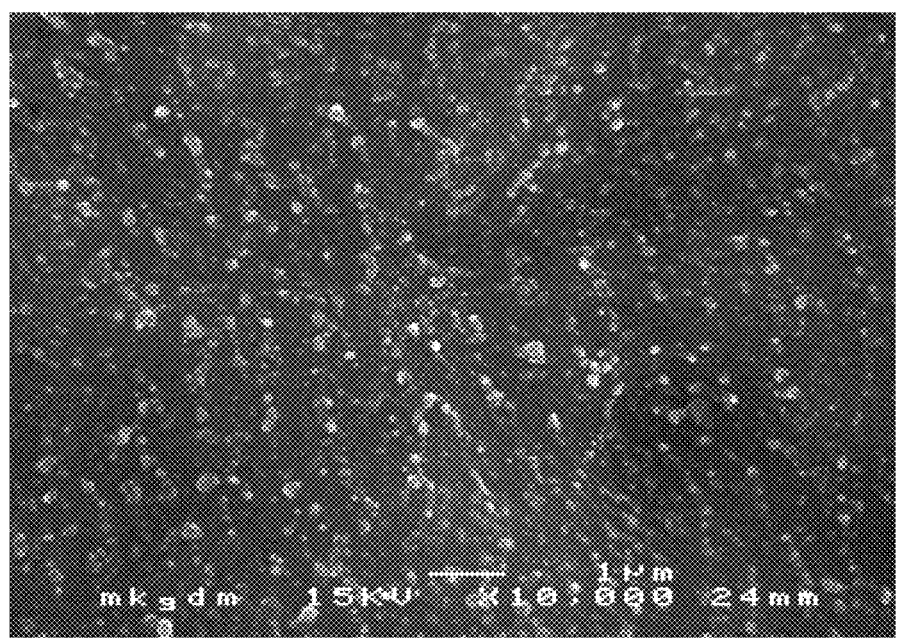
FIG. 1 is an SEM (Scanning Electron Microscope) diagram of CSNP-AmpB-Gls prepared according to embodiment 1.

The following further describes and explains the technical solution of the invention with reference to embodiments.

1. Material and Method

1.1 Fungus Strain, Culture Medium and Reagent

Fungus strain: *Candida albicans* DAY185; 3 clinical isolates of *Candida albicans*, obtained from Medical University of Vienna, named as *Candida albicans* BF 1, BF 2 and BF 3.

Culture medium: yeast peptone dextrose culture medium (YPD), and RPMI 1640 culture medium.

Other reagents: β-1,3-glucanase (Gls) (greater than or equal to 200 units/mg protein), chitosan (low molecular weight; degree of deacetylation: 75-85%), amphotericin B (AmpB), etc., which are all purchased from Sigma-Aldrich.

Embodiment 1

(1) Polyanionic sodium triphosphate (TPP) is used for preparing the chitosan nanoparticles (CSNP) through an ionic gelation method.

(2) Preparation of Gls loaded chitosan nanoparticles, namely CSNP-Gls: CSNP (1 mg/mL PBS) is mixed with Gls (100 mcg/mL PBS), and the mixture is stirred at 4° C. overnight; Then, the NP suspension is centrifuged for 30 min (14000 rpm), and then freeze-dried.

(3) Preparation of Gls and AmpB loaded chitosan nanoparticles (CSNP-AmpB-Gls): the CSNP-Gls suspension (1 mg/mL) is mixed with an AmpB (100 mcg/mL dimethyl sulfoxide), and the mixture is stirred for 24 h; then, the mixture is centrifuged and freeze-dried.

(I) Characterization of Nanoparticles

The size of the nanopaticles is analyzed through dynamic light scattering (DLS), and potential is measured with a laser doppler velocimeter, and the morphological characteristics thereof are verified by an scanning electron microscope. A yeast suspension is used as a substrate to evaluate NPs-containing Gls activity. Adsorption at 405 nm is measured through spectrophotometry so as to calculate the AmpB drug loading capacity of the nanoparticles (LC) according to the following formula: LC=(A-B)/C (A=AmpB total amount; B=unloaded AmpB content; C=NPs weight).

(II) In-Vitro Release

The in-vitro release kinetics is performed as follows: 4 mL of CSNP-AmpB-Gls solution (1 mg/mL) is put in a dialysis bag, and the dialysis bag is put in 40 mL of PBS under a stirring condition (100 rpm). 4 ml of PBS is taken at a given time point and replaced with 4 mL of fresh PBS. AmpB amount in the solution is measured at 405 nm through ultraviolet spectrophotometry.

(III) Minimum Inhibitory Concentration Determination

100 μl of *Candida albicans* ($1 \times 10^6$ CFU/mL) is added to a 96-pore plate containing different concentrations (2, 1, 0.5, 0.25, 0.125, 0.0625 or 0 μg/mL) of free AmpB and CSNP-AmpB-Gls. The micropore plate is rotated at a rotation speed of 150 rpm and incubated at 37° C. for 24 h. The minimum inhibitory concentration is defined as the minimum AmpB concentration at which visible growth cannot be detected.

(IV) Biofilm Growth

A biofilm is formed on the 96-pore plate, the *Candida albicans* is diluted to $1 \times 10^6$ CFU/mL and incubated at 37° C. for 24 h, without shaking.

(V) Biofilm Penetrability of Nanoparticles

CSNP (CSNP-RBITC) is labeled by Rhodamine B isothiocyanate. The *Candida albicans* forms a biofilm on a medical silica gel, and the biofilm is mixed with 100 mcg/mL CSNP-RBITC for 2 h and then washed with PBS. The penetrability of the nanoparticles is measured by laser scanning confocal microscopy (CLSM).

(VI) Influence of Nanoparticles on Mature Biofilm

The *Candida albicans* forms mature biofilms in 24 h as mentioned above, and the biofilms are added with different concentrations of free AmpB, a combination of free AmpB and Gls (2 μg/ml), CSNP-AmpB and CSNP-AmpB-Gls. After 24 h, the biofilms are washed with PBS and quantified by CCK-8 reduction test.

(VII) Influence of Medical Silica Gel Surface Biofilm

The biofilm on a silica gel is treated by free AmpB and NPs by following the method described above. The biofilm structure is studied through a scanning electron microscope. The biofilm survivability is observed with CLSM, and viable/dead fungus staining kit is used for staining, (VIII) Clinical Isolate Activity The anti-biofilm effect of free AmpB and NPs (2 μg/ml) on several clinical isolates is detected.

2. Results 2.1 Characterization of Nanoparticles

As displayed under the scanning electron microscope, CSNP-AmpB-Gls is in the form of round particles (FIG. 1). The average particle size of CSNP-AmpB-Gls is 174.47±5.12 nm, and the surface ζ potential is +15.84±1.41 mv. The drug loading capacity is 3.05±0.13%. Gls loaded on the nanoparticles keeps activity, and the activity thereof is 128.6±4.54 U/mg nanoparticles.

2.2 Study on In-Vitro Release

Figure 2:
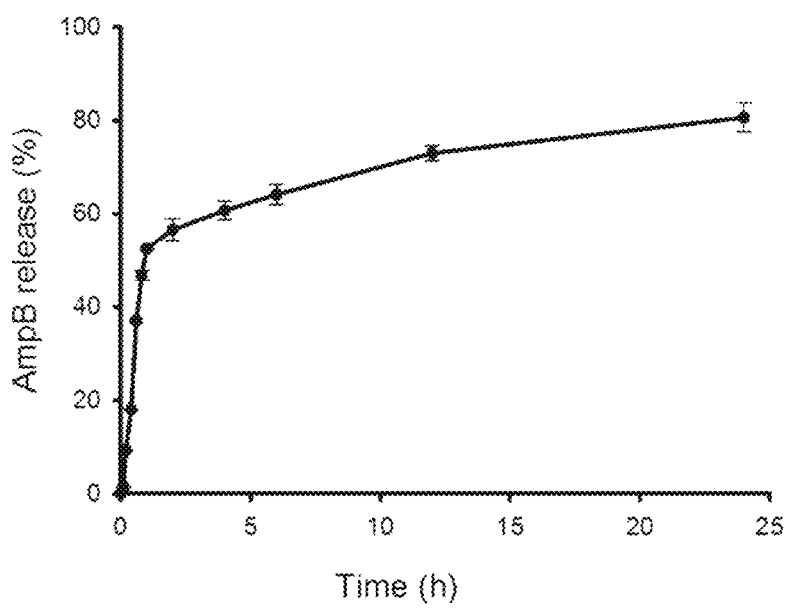
FIG. 2 is a curve diagram for AmpB release from NPs.
Figure 3:
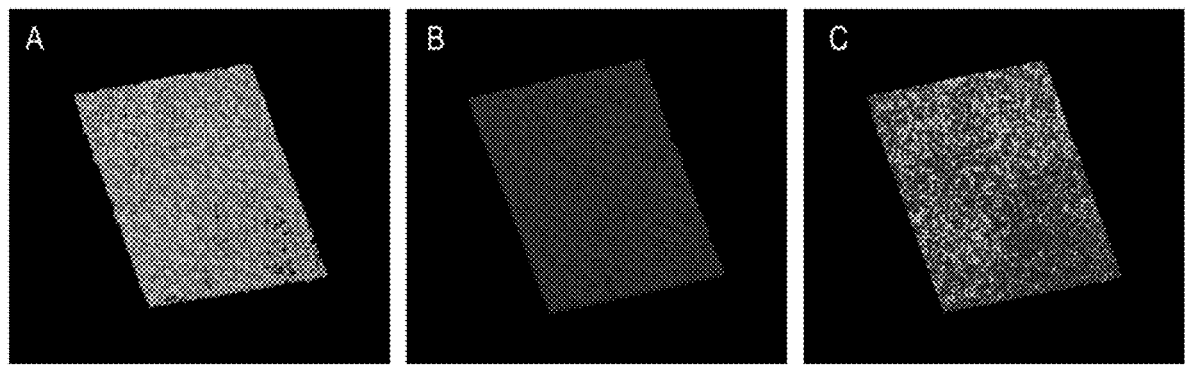
FIG. 3 is an LSCM (Laser Scanning Confocal Microscopy) diagram for biofilm penetrability of nanoparticles prepared according to embodiment 1.
Figure 4:
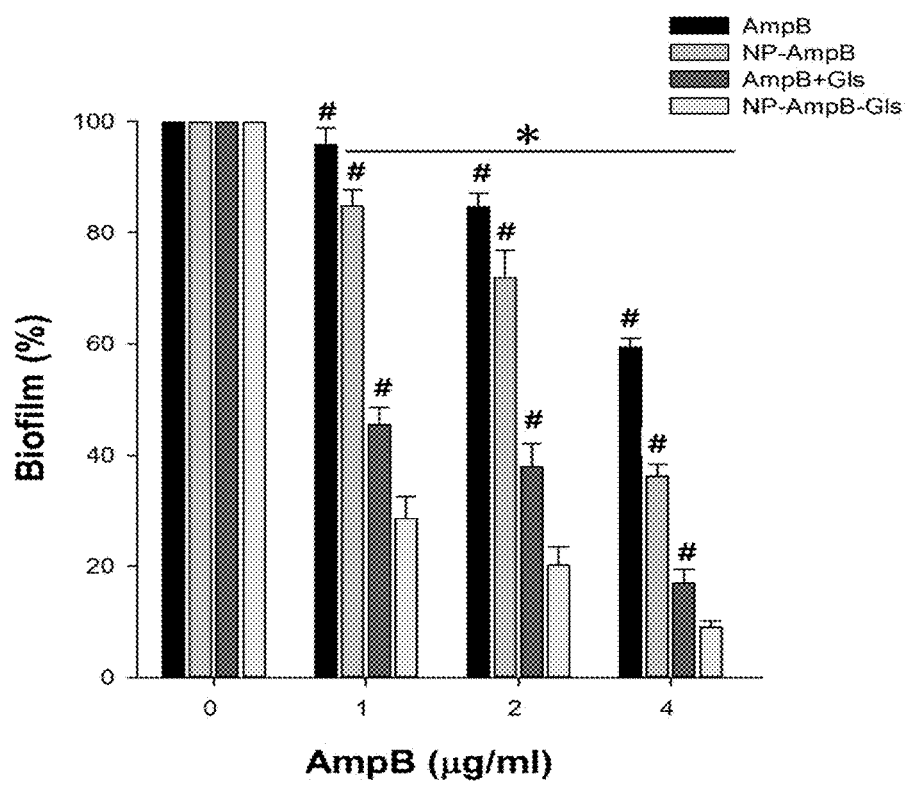
FIG. 4 is an effect diagram for mature biofilm damage removal of nanoparticles prepared according to embodiment 1.
Figure 5:
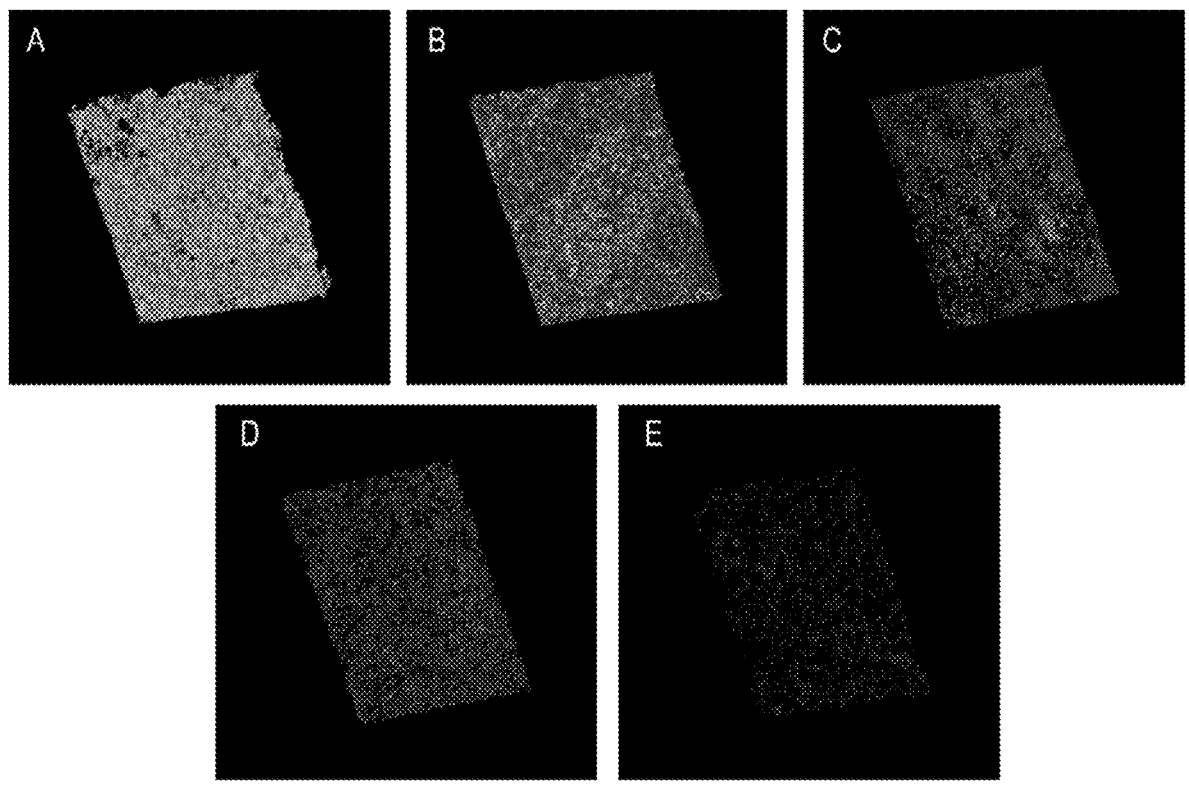
FIG. 5 is a cell viability diagram of a biofilm.
Figure 6:
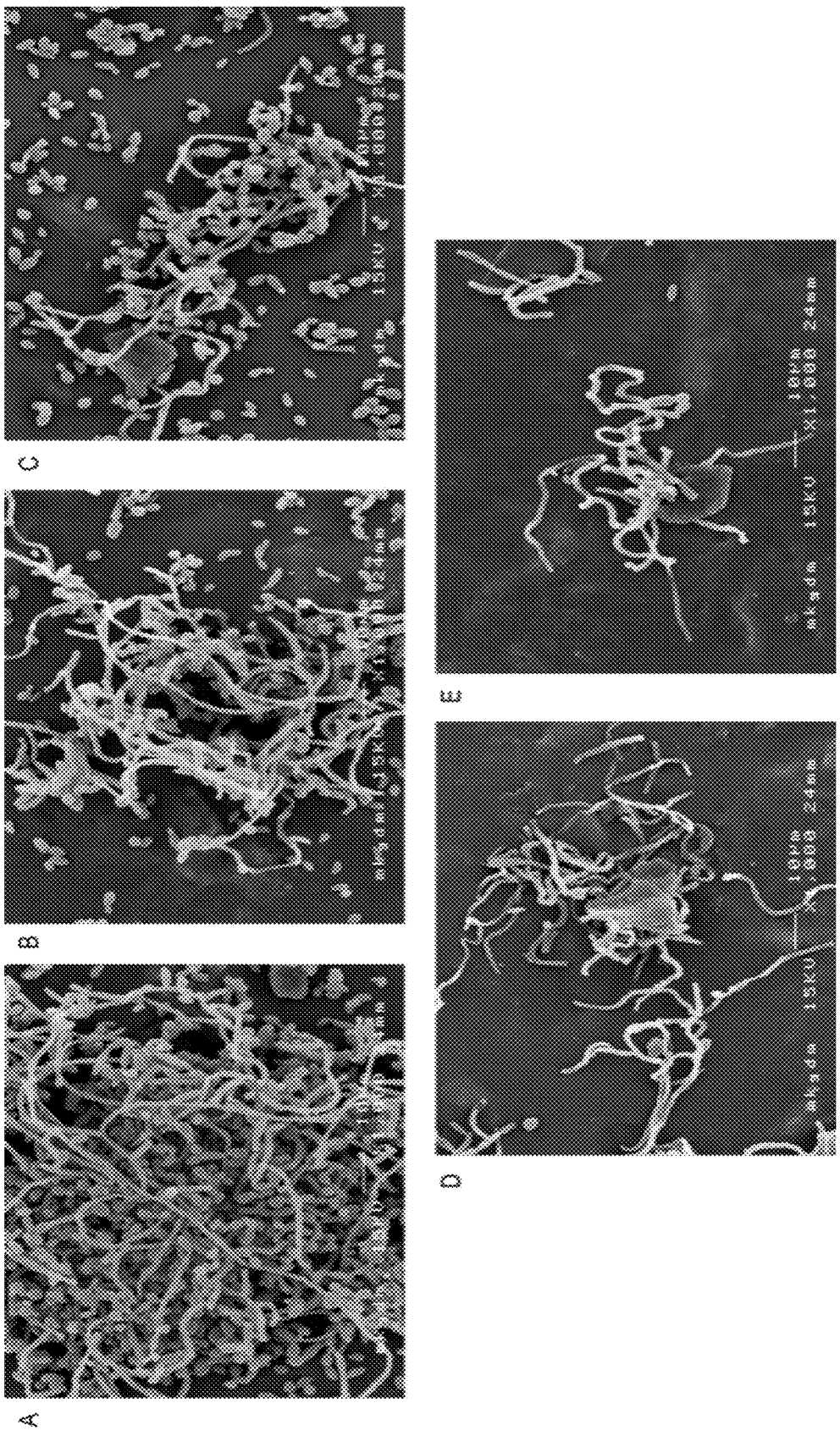
FIG. 6 is an SEM diagram of biofilm structure change.
Figure 7:
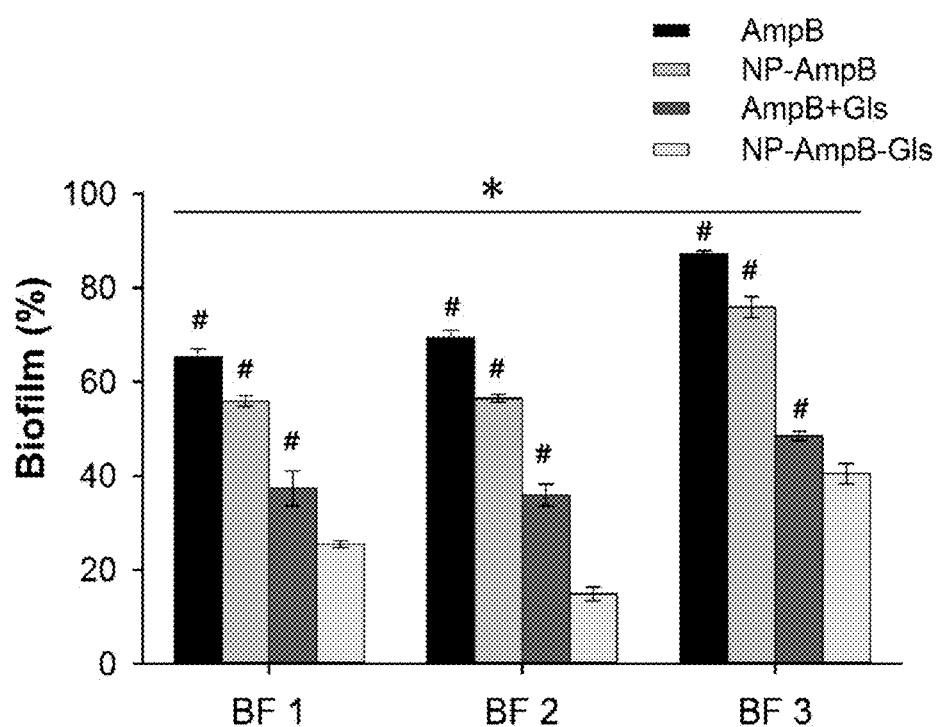
FIG. 7 is a clinical isolate activity diagram of CSNP-AmpB-Gls prepared according to embodiment 1.

FIG. 2 displays a curve diagram for AmpB release from NPs. CSNP-AmpB-Gls presents an initial explosive release stage within the first one hour: 52.5% of the total AmpB is released. After this stage, the drug release speed is reduced. After 24 h, 80.6% of total AmpB is continuously released by CSNP-AmpB-Gls.

2.3 Minimum Inhibitory Concentration Determination

Table 1 shows the minimum inhibitory concentration determination of free AmpB and CSNP-AmpB-Gls for airborne *Candida*. Free AmpB and NPs are effective for the growth of experimental strains and clinical isolates, and show the same minimum inhibitory concentration. This result shows that the loading of AmpB on CSNP will not change the antifungal activity of AmpB for airborne *Candida*.

TABLE 1

| | AmpB MIC (μg/ml) | |
|---|---|---|
| | AmpB | CSNP-AmpB-Gls |
| DAY 185 | 1 | 1 |
| BF 1 | 2 | 2 |
| BF 2 | 2 | 2 |
| BF 3 | 4 | 4 |

2.4 Biofilm Penetrability of Nanoparticles

After the biofilm is treated by the nanoparticles for 2 h, the nanoparticles (red) can be observed on the biofilm surface and inside the biofilm, which indicates that the nanoparticles can be adhered on and penetrate into the biofilm (FIG. 3). The nanoparticle with a positive charge can be coupled with a bacterial biofilm matrix component with a negative charge. In addition, the chitosan has the capability of penetrating the biofilm. Herein, CSNP is proved to penetrate the *Candida* biofilm, which can promote the drug effect inside the biofilm.

2.5 Anti-Biofilm Activity

Due to the high resistance of the biofilm to antibacterial agents, 4-fold MIC is used for evaluating the working activity for the mature biofilm (FIG. 4). As expected, in comparison with the airborne form, the *Candida* in the biofilm increases the resistance to free AmpB or Gls-excluding NPs. However, AmpB+Gls and CSNP-AmpB-Gls show excellent biofilm damage effect. In addition, CSNP-AmpB-Gls presents the highest activity for removing the pre-prepared biofilm under any test concentration. When AmpB concentration is 4 μg/ml, AmpB+Gls reduces the biofilm by 83.1%, and CSNP-AmpB-Gls reduces the biofilm by 90.9%.

On the formed biofilm, the results show that the nanosystem has better anti-biofilm activity than free AmpB (with or without Gls), which indicates the superiority of NPs for biofilm treatment. The nanoparticles can protect the loaded antibacterial agents from being isolated by the biofilm matrix. In addition, the nanoparticles can transport the drugs into the biofilm matrix and directly target the microbial cells in the biofilm, so as to maximally improve treatment effect. Compared with free AmpB and CSNP-AmpB, AmpB+Gls and CSNP-AmpB-Gls show better anti-biofilm activity, which indicates the synergistic effect of Gls. The degradation of β-1,3-glucan damages the biofilm matrix, which accordingly improves AmpB efficiency. This result is consistent with our previous work. In addition, CSNP-AmpB-Gls shows the highest antimicrobial film activity, and this indicates that Gls and AmpB loaded CSNPs have the effect of better killing fungal cells. This is attributed to Gls capable of decomposing the biofilm structure to facilitate the migration of NPs with a positive charge and combine NPs with the biofilm components with a negative charge, so that the local AmpB concentration is increased to improve anti-biofilm activity.

2.6 Effect of Nanoparticles on Silica Gel Biofilm

The cell viability of the biofilm on the silica gel is observed by CLSM (FIG. 5). Without any treatment, a lot of green (viable cells) (FIG. 5A) is observed, which indicates that the mature biofilm mainly comprises viable cells. After the biofilm is treated by free AmpB and CSNP-AmpB, green (viable cells) is significantly reduced (FIGS. 5B and 5C). Compared with free AmpB treatment, the combination with Gls shows more red (dead cells) and less biofilm thickness (FIG. 5D and E).

The SEM diagram has proved the above-mentioned results and disclosed the biofilm structure change (FIG. 6). In the control group, a typical compact composition of the biofilm can be seen (FIG. 6A). The use of free AmpB and CSNP-AmpB for treatment significantly reduces fungus colonization (FIG. 6B and C). In addition, AmpB+Gls and CSNP-AmpB-Gls only produce single cells on the silica gel and even do not produce any cells (FIG. 6D and E), which indicates that the biofilm structure is damaged with the killing of *Candida* cells.

2.7 Clinical Isolate Activity

As shown in FIG. 7, the biofilms formed by all clinical isolates are reduced. CSNP-AmpB-Gls also shows the best anti-biofilm activity, which reduces the biofilms of the clinical isolates by 74.5%, 85.2% and 59.5%.

The invention claimed is:

1. An amphotericin B (AmpB) and β-1,3-glucanase (Gls) loaded bi-functional nano-system with both targets, wherein the nano-system comprises Gls and AmpB loaded chitosan nanoparticles (CSNP); the CSNP-AmpB-Gls have an average particle size of 174.47±5.12 nm, a surface ζ potential of +15.84±1.41 my, and a drug loading capacity of 3.05±0.13%; and the Gls have an activity of 128.6±4.54 U/mg nanoparticles.

2. A preparation method of the bi-functional nano-system with both targets according to claim 1, comprising the following steps:
   (1) polyanion sodium tripolyphosphate is used for preparing the chitosan nanoparticles (CSNP) through an ionic gelation method;
   (2) preparation of Gls loaded chitosan nanoparticles CSNP-Gls: CSNP and Gls are added to a phosphate-buffered saline (PBS) buffer solution at the same time; the mixture is stirred at 4° C. for 12 h; then, the CSNP suspension is centrifuged and freeze-dried;
   (3) preparation of Gls and AmpB loaded chitosan nanoparticles CSNP-AmpB-Gls: the CSNP-Gls suspension is mixed with an AmpB dimethyl sulfoxide solution and the mixture is stirred for 24 h; then, the mixture is centrifuged and freeze-dried.

3. The preparation method according to claim 2, wherein in the step (1), the chitosan nanoparticles CSNP are specifically prepared by the following method: TPP is dissolved in distilled water to obtain a trisodium polyphosphate (TPP) solution with a concentration of 5 mg/mL; chitosan is dissolved in an acetic acid solution with a volume concentration of 1% to obtain a chitosan solution with a concentration of 5 mg/mL; the TPP solution is dropwise added to the chitosan solution, the mixture is stirred for 2 h and then centrifuged.

4. The preparation method according to claim 3, wherein the mass ratio of chitosan and TPP is 4:1.

5. The preparation method according to claim 2, wherein in the step (2), the concentration of the CSNP in the PBS buffer solution is 1 mg/mL; the concentration of the Gls in the PBS buffer solution is 100 mcg/mL.

6. The preparation method according to claim 2, wherein in the step (2), the centrifugal rotation speed is 14000 rpm, and the time is 30 min.

7. The preparation method according to claim 2, wherein in the step (3), the concentration of the CSNP-Gls suspension is 1 mg/mL, and the solvent is the PBS buffer solution; the concentration of the AmpB dimethyl sulfoxide solution is 100 mcg/mL; the volume ratio of the CSN-Gls suspension and the AmpB dimethyl sulfoxide solution is 1:1.

* * * * *